Sept. 29, 1970　　　　　　D. E. CANTRILL　　　　　　3,531,360
FIXTURE FOR MACHINE PROCESSING A LAMINATED PRODUCT
Filed Nov. 29, 1967　　　　　　　　　　　　　　　　5 Sheets-Sheet 2

Fig. 2

INVENTOR.
DONALD E. CANTRILL
BY
Horton, Davis, Brewer & Brugman
ATTORNEYS

Sept. 29, 1970  D. E. CANTRILL  3,531,360
FIXTURE FOR MACHINE PROCESSING A LAMINATED PRODUCT
Filed Nov. 29, 1967  5 Sheets-Sheet 3
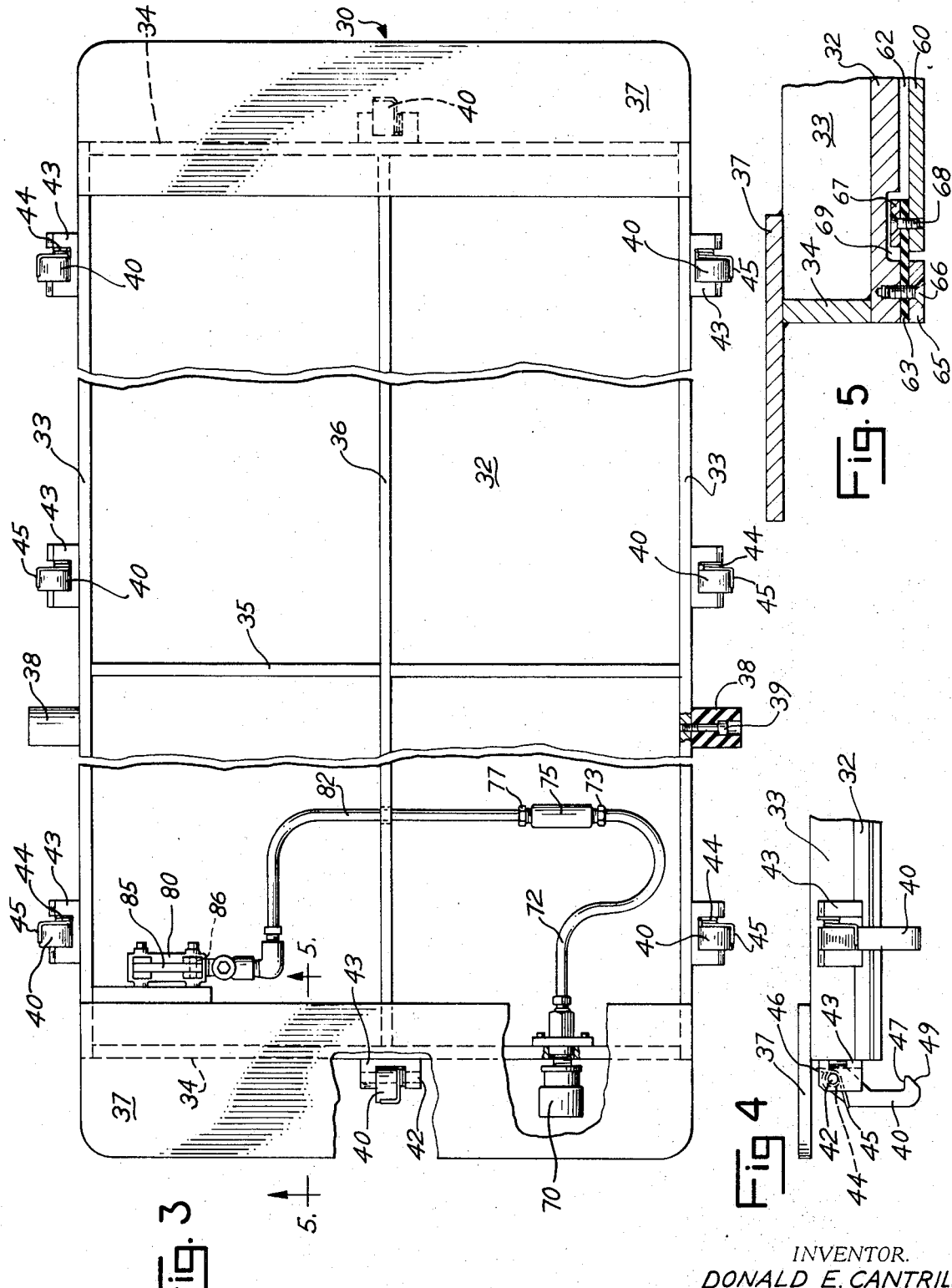
INVENTOR.
DONALD E. CANTRILL
BY
Horton, Davis, Brewer & Brugman
ATTORNEYS

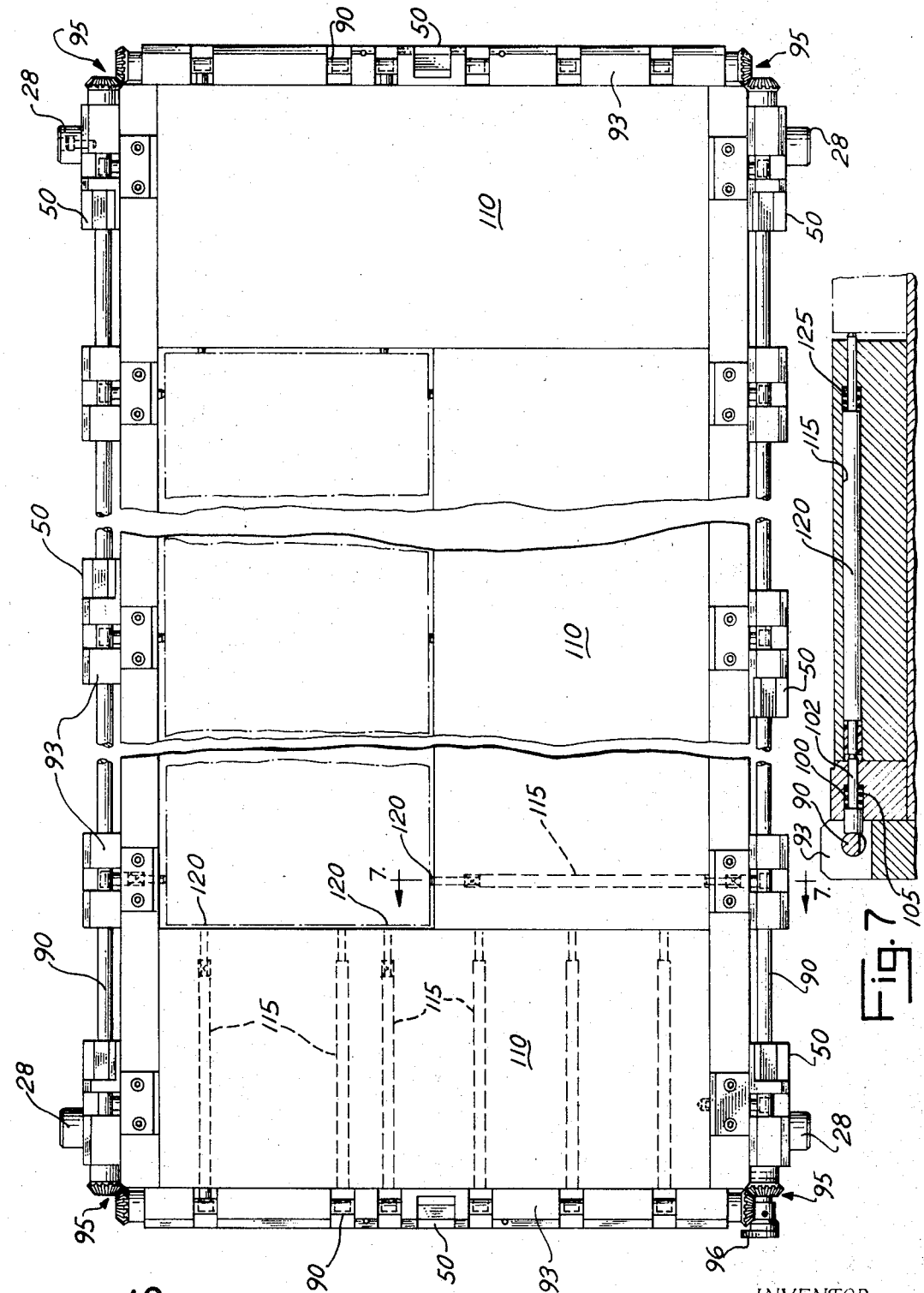

Sept. 29, 1970      D. E. CANTRILL      3,531,360
FIXTURE FOR MACHINE PROCESSING A LAMINATED PRODUCT
Filed Nov. 29, 1967      5 Sheets-Sheet 5
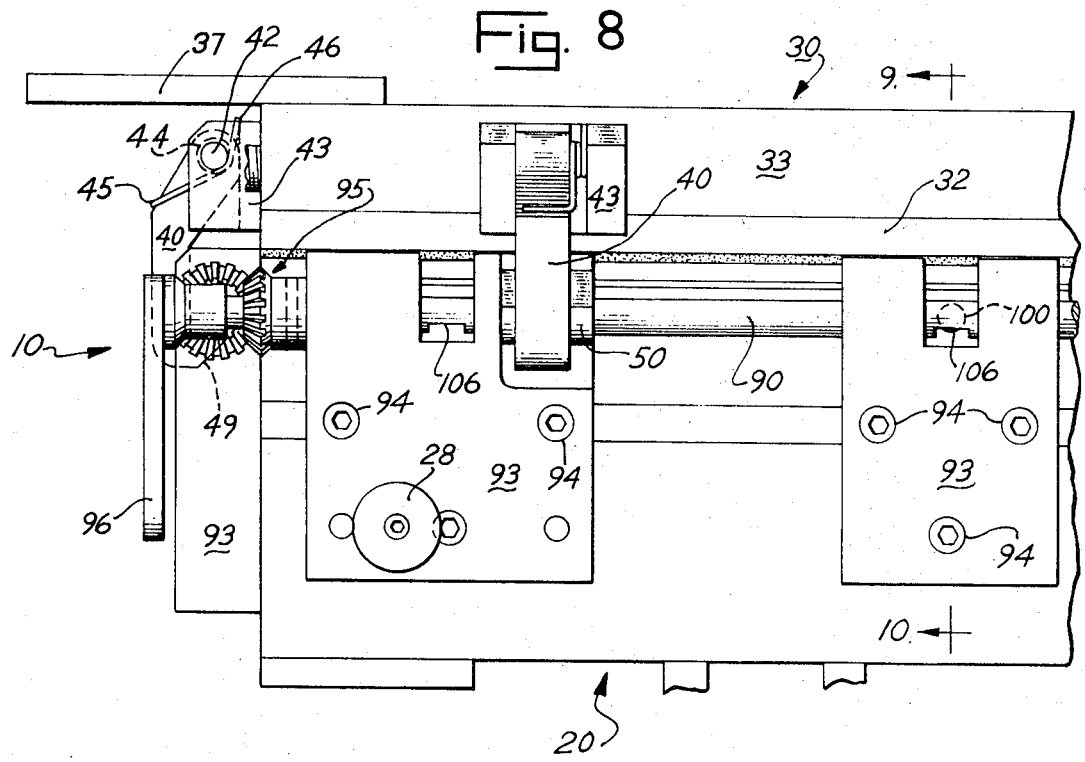
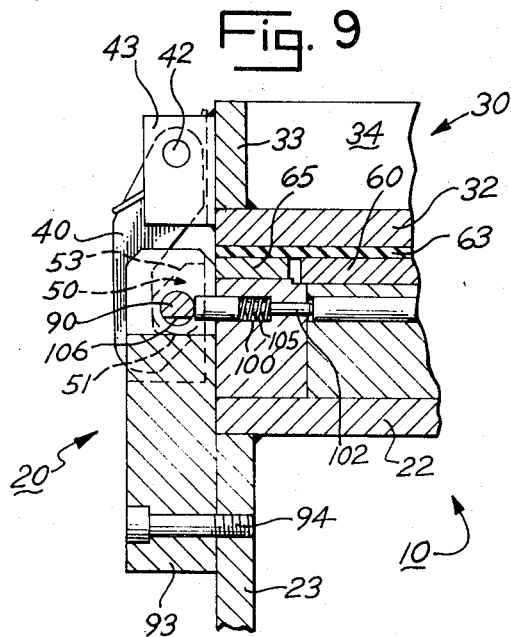
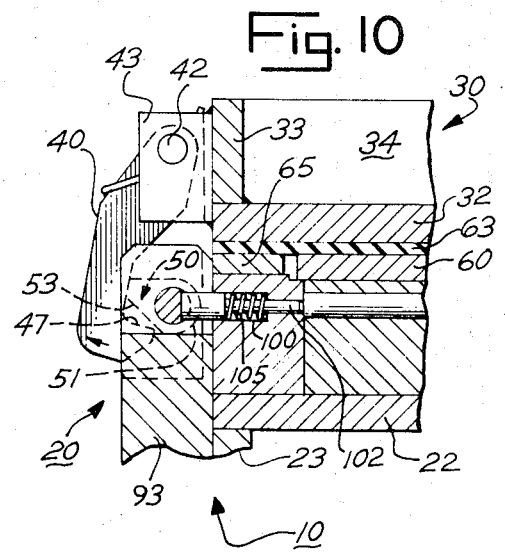
INVENTOR.
DONALD E. CANTRILL
BY
Horton, Davis, Brewer & Brugman
ATTORNEYS

United States Patent Office 3,531,360
Patented Sept. 29, 1970

1

3,531,360
FIXTURE FOR MACHINE PROCESSING A LAMINATED PRODUCT
Donald E. Cantrill, East Moline, Ill., assignor, by mesne assignments, to Home Comfort Products Co., Princeville, Ill., a corporation of Illinois
Filed Nov. 29, 1967, Ser. No. 686,674
Int. Cl. B32b 31/20
U.S. Cl. 156—580                    13 Claims

ABSTRACT OF THE DISCLOSURE

A fixture having a pneumatic chamber with pressure plate for clamping together a laminated product while traveling through a processing machine therefor. The lid and base of the fixture are automatically clamped by spring biased hooks and automatically unclamped by rotation of detent blocks engaged by the hooks. The rotation, by linkage to a trip lever, positions a release chamfer of the detent blocks opposite the hooks. Retractable pegs for positioning the product within the fixture, are cam actuated by the linkage rotation, to extend and retract simultaneously with the clamping and unclamping, respectively. Pneumatic pressure is admitted through an insert receptacle to the chamber against the pressure plate and laminated product. A release valve opened by the depression of an inclined lever provides for automatic pressure relief.

BACKGROUND OF THE INVENTION

This invention relates generally to clamping fixtures, and more particularly, to an automated fixture for the machine processing of a laminated product.

Many modern products, such as foam-core plastic doors and panels, are produced by a laminating process requiring secure clamping together and application of pressure. Furthermore, the pressure should be equal and even, particularly for foamed core products. Mass production of these items is highly desirable and a high rate of production could be obtained by machine, if assembly, clamping and application of pressure could be automated. Thus, there is need for a fixture which affords easy, automated assembly, clamping, pressurizing, and unclamping of a laminated product during travel through a machine.

SUMMARY OF THE INVENTION

Therefore, to provide the foregoing and to overcome other difficulties of the prior art, the general object of this invention is to provide a new and improved fixture for use in the automatic machine processing of laminated products. To this end, the present invention provides a two-part fixture, that is, a lid and a base. Spring biased hooks pend from the periphery of the lid for clamping engagement with detent blocks along the periphery of the base. The lid includes a hollow chamber and a movable pressure plate. The chamber is sealed by a flexible diaphragm affixed between the peripheries of the lid and plate. An accessible receptacle allows automatic insertion of pressure into the chamber by machine operation. A release valve, opened by the depression of an inclined lever, provides a relief exhaust to the chamber.

The base forms a steady assembly surface with upright positioning members along its periphery. Rods journaled in the positioning members are linked for rotation together by a trip lever. The detent blocks are mounted on the rods and may be rotated to position a release chamfer opposite the lid hooks for automatic unclasping thereof.

Retractable pegs extend from bores in the positioning members perpendicular to the rods. Ends of the pegs contact and align the edges of the laminated product. The pegs are spring biased toward the rods, which have flat portions, for rotation into position, to allow retraction of the pegs simultaneous to unclamping of the hooks.

Various sized inserts with extension pegs are provided for interchange in the product size.

It is understood, of course, that the automatic actions of the invented fixture are activated during travel thereof through the machine.

Thus, one of the objects of this invention is to mass-produce laminated products by machine.

It is an object of this invention to provide a fixture for the automatic assembly, clamping, pressurization, and unclamping of a laminated product during travel through a machine therefor.

Another object of this invention is to provide a fixture allowing automatic operation in a simplified, positive manner.

It is still another object to provide a durable and foolproof fixture which is economical to produce and a fixture that lends itself to standard, mass-production manufacturing techniques.

Further and other objects, and a more complete understanding of this invention may be had by referring to the following description and claims, taken in conjunction with the accompanying drawings.

DESCRIPTION OF THE DRAWINGS

For the purpose of illustrating the invention, there is shown on the drawings, the form which is presently preferred, it being understood, however, that this invention is not necessarily limited to the precise arrangements and instrumentalities there shown.

FIG. 2 is a schematic side view of a typical machine utilizing the invented fixture.

FIG. 3 is a partial plan view of the fixture lid.

FIG. 4 is a partial side detail of FIG. 3.

FIG. 5 is a partial section taken along line 5—5 of FIG. 3.

FIG. 6 is a partial plan view of the fixture base.

FIG. 7 is a partial section taken along line 7—7 of FIG. 6.

FIG. 8 is an enlarged partial end detail of the fixture showing a lid and base clamped together.

FIGS. 9 and 10 are cross-sections taken along line 9–10 of FIG. 8 showing clamping and retraction positions of parts.

DESCRIPTION OF THE PREFERRED EMBODIMENT

Figure 1:
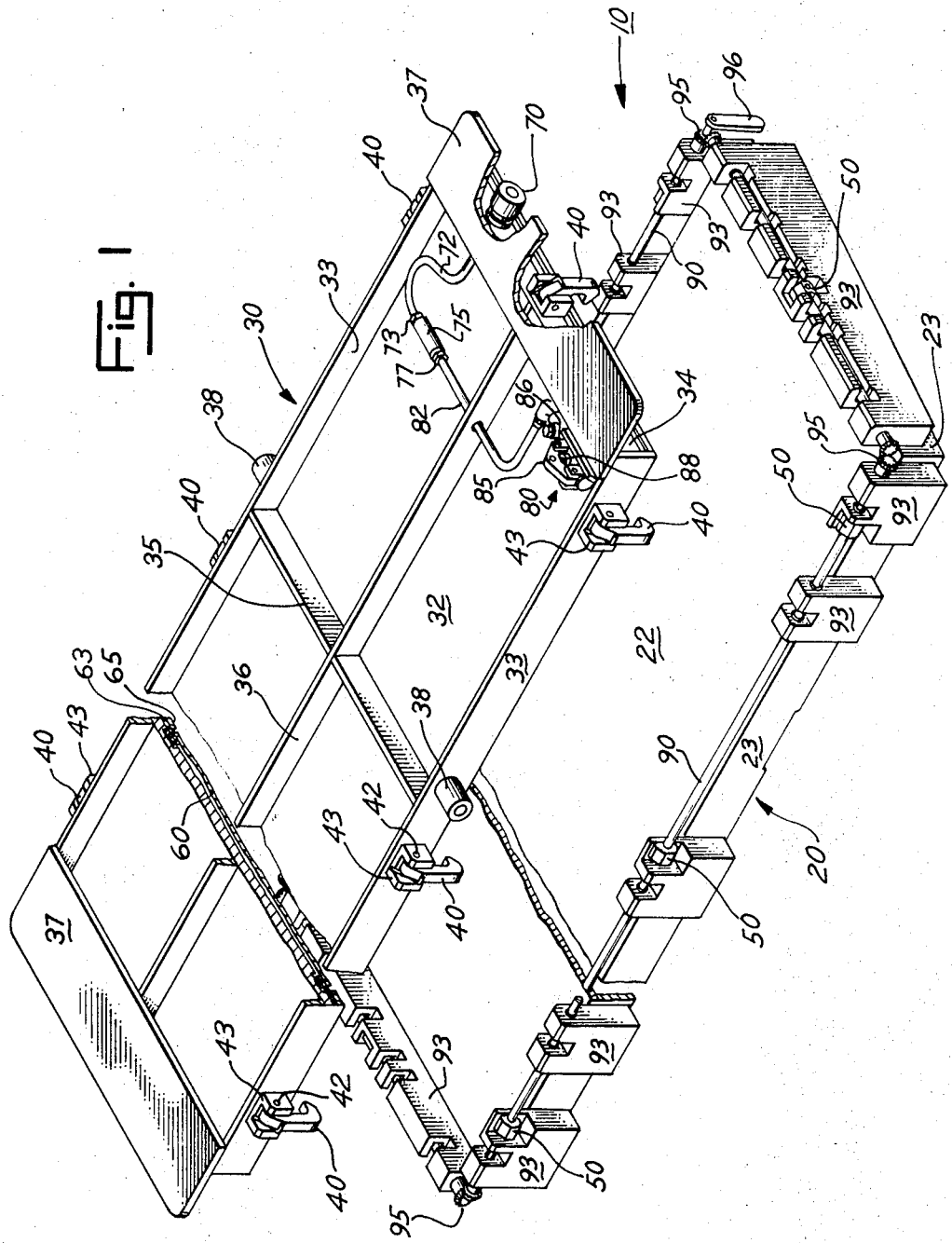
FIG. 1 is an exploded perspective view, partially in section, of a fixture embodying the invention.

Referring now to the drawings in detail, wherein like numerals indicate like elements, there is shown in FIG. 1 an illustration of the fixture of the present invention designated generally at 10. The fixture is in two major parts, namely, a base 20 and a lid 30. Both are fabricated of a suitably durable, strong material, preferably a metal, by casting or welding. In the interest of weight reduction, a hollow box-type construction is utilized for both the base 20 and lid 30. For example, the section of FIG. 1 reveals that base 20 is hollow, having a flat, steady assembly wall 22 and upright side walls 23. In this manner, the construction of base 20 is suitably rigid, durable, yet relatively lightweight.

The lid 30 also has a hollow-box-type construction, somewhat in a modified I-section to provide for the hollow chamber described hereinafter. That is, as may be visualized by reference to the section of FIG. 1, the lid wall 32 has peripheral flange-like walls 33, 34. Reinforcement webs 35, 36 are welded, or otherwise suitably fastened to the top of the lid wall 32, as shown, to form a rigid, yet lightweight structure. Lifting plates 37 may be suitably affixed to extend from the top of upright members 33, 34 at opposite sides of the lid 30, as shown. Elastic cylindrical bumpers 38 may be fastened by countersunk screws 39 to extend outwardly from front and back at walls 33, as shown in detail at FIG. 3. Similar bumpers 28, shown in FIGS. 6 and 8, may also be included for the front and back of base 20. The rectangular lid and base configuration has been found to be the most versatile and practical. Nevertheless, shapes other than rectangular are understood to be acceptable, depending on the desired product shape.

Clamping means to automaticlly fasten the lid 30 on base 20 may be provided by hooks 40, in engagement with detent blocks 50. The hooks 40 are journaled to pivot on pins 42 mounted on suitably sturdy brackets 43 fastened to extend from the flange walls 33, 34, as shown. The pins 42 parallel the lid periphery. A spring 44 loops around each of the pins 42 with extending spring branches 45, 46 engaging hooks 40 and brackets 43. An outward pivoting of hooks 40 tends to compress spring branches 45, 46 together. Thus the hooks 40 are biased to pivot inwardly with respect to the lid 30. It is to be observed that the hooks 40 include an engagement surface 47 and an inclined leading surface 49, as shown at FIG. 4.

Referring to the detail of FIGS. 9 and 10, the detent blocks 50 include an under-surface 51 for engagement by surface 47 of the hooks 40. The detent blocks are somewhat oblong, the longer dimension being perpendicular to the under-surface 51. A chamfer 53 is provided at the opposite end from the under-surface 51 of each detent block 50. Thus outward rotation of the detent block 50 will force the hooks 40 outward until hook engagement surfaces 47 are opposite chamfers 53, as in FIG. 10. Then separation of the base and lid is possible by merely lifting lid 30 upward, since the hooks 40 will ride outward along the chamfers 53 against the bias of springs 44.

A pneumatic means for applying pressure in the invented fixture, is illustrated best by reference to the enlarged cross-sectional detail of FIG. 5. A pressure plate 60 closely fits within a cavity in wall 32 to define a chamber 62 at the underside of lid 30. The chamber 62 is sealed by a resilient diaphragm 63 clamped along the peripheries of the lid 30 and plate 60. Notice that the chamber 62 is of rather limited depth, that is, the separation provided by the thickness of diaphragm 63 between lid wall 32 and plate 60. The diaphragm 63 is preferably of a rugged and durable plastic material. A strip 65 through which countersunk machine screws 66 pass, provides an air-tight, secure fastening along the peripheries of diaphragm 63 and lid 30. As shown, diaphragm 63 is sandwiched between lid 30 and strip 65. Lid 30 is tapped for threaded reception of screws 66 which are tightened for a secure clamping. A similar method is utilized to attach diaphragm 63 at the periphery of the plate 60. That is, a clamping strip 67 and machine screws 68 are utilized to sandwich the diaphragm 60 therebetween in a similar manner, as shown. It is clear that though providing an air-tight seal, the diaphragm 63 is readily replaceable. Notice that the under side of lid wall 33 is grooved at 69 to receive the clamping strip 67. Furthermore, screws 66, 68 are countersunk and edge strip 65 is the same thickness as plate 60. Thus a flat, even clamping surface is presented to the laminated product therebelow.

A female receptacle 70 having a check valve is connected by a conduit 72 to a branch 73 of a coupling 75 communicating with chamber 62. The receptacle 70 extends outward from an end of lid 30 at an accessible position. The check valve (not visible), is of a well-known type similar to that used in pneumatic tires, etc., to allow passage of pressure to the chamber, and yet prevents escape thereof. It is understood that although male receptacle might be equally acceptable, the female receptacle 20 has been found ideal for reception of a nozzle or the like (not shown), for automatic insertion to admit a pressurized fluid such as air.

Release means are provided for automatic relief of pressure in the chamber 60 at the end of a manufacturing cycle. In the embodiment shown in the drawing, a conduit 82 connects the remaining branch 77 of coupling 75 to a release valve 80. An inclined lever 85 is provided to open valve 80. The lever 85 pivots downward about pin 86 against the upward bias of valve release stem 88. Thus, as may be visualized, depression of th elever 85 by moving contact past a machine stop, will automatically open valve 80 and release pressure in chamber 60.

Trip means are also provided to rotate detent blocks 50 and automatically disengage the base 20 and lid 30. The detent blocks 50 are secured in position on rods 90 by conventional means, such as tap screws, or the like. Rods 90, in turn, are journaled for rotation in upright positioning members 93 spaced along the periphery of the base member 20 by means of screws 94. Observe that rods 90 are rotationally linked together by a beveled gear arrangement 95, at each corner of base 20. A trip lever 96 is mounted on an extension of one of the rods and extends downward to a position accessible for contact by a limit stop. Rotation of the trip lever 96 by moving contact with a stop will, of course, rotate rods 90 and the detent blocks 50 for release of the hooks 40.

With reference to the enlarged detail shown in FIGS. 8, 9, and 10, it is to be noted that the upright positioning members 93 include bores 100 perpendicular to the rods 90. Positioning pegs 102 are received in the bores and biased by springs 105 toward the rods 90. The rods have flats 106, which when rotated to positions opposite the pegs 102, as in FIG. 10, to permit an outward retraction thereof by virtue of springs 105. It is to be noted that the flats 106 have an angular relationship illustrated with respect to chamfers 53 of the detent blocks 60. Thus, when the trip lever 96 is turned to rotate rod 90, a simultaneous unclamping of hooks 40 and retraction of pegs 106 takes place.

It is desirable that the fixture be adaptable for various sized laminated products. For this reason, directing attention to the plan view of FIG. 6, insert members 110 are provided as spacers to reduce the size within the base 20. It is to be noted that bores 115 are provided in insert members 110 opposite the positioning pegs 102. Extension pegs 120 within bores 110 extend between pegs 106 and the edges of the laminated product for alignment thereof. Springs 125 bias pegs 120 toward pegs 102. In this manner, the base 20 may be adapted for various sizes of laminated product.

Operation of the invented fixture 10 is described with reference to the typical machine process schematically shown in FIG. 2. The machine, generally indicated at 130, includes various stations within the enclosed metal framework 132. An oven portion 135, having heating elements (not shown), may be provided for the application of heat, if desired. Travel through the machine 130 is provided for by one or more conveyors 136, 137, or the like; for instance, endless chain type conveyors.

The fabrication process begins at assembly station 140, when a base 20 is raised to the level of conveyor 136 by a lift 142. A bottom laminate, such as a panel skin and a glue covered framework (not shown) are placed on the base 20. Trip lever 96 is at its downward position to extend pegs 102 for proper alignment of the product. The base 20 is then advanced by the conveyor 136 to the foam application station 150. Various limit switches at 145, 155, 163, 165 and 167 are contacted by the base 20 to activate various machine components for proper positioning and step application at each station. A metered amount of foam is applied by the foam applicator 153. Then base 20 advances to the next station 160 for application of a top skin by an automatic applicator 162 which pivots downward for placement thereon. Upon return pivot upward of applicator 162, a lid 30 is released to roll downward off of gravity roller conveyor 138 onto base 20. As the lid 30 comes downward on to the base 20, the leading surface 49 of hooks 40 engages the upward facing chamfers 53. The weight of lid 30 forces it downward, with the hooks 40 riding outward against the bias of springs 44 until the hook engagement surface 47 passes the detent block 50, whereupon the hooks snap inward to under surfaces 51 and clamp the base 20 and lid 30 together. A nozzle (not shown) is automatically inserted into the receptacle 70 to admit pressure into chamber 62 and against the plate 60. This provides for an even, equal pressure on the laminated product. Then the fixture 10, including the laminated product clamped therebetween, travels through the machine and oven 135 on the conveyor 137.

Separation station 170 is at the far end of the oven 135. There a pressure release stop 171 is engaged by the inclined lever 85, which forces it downward to open valve 80 for release of the pressure in chamber 62. An unclamping stop 173 is also engaged by the trip lever 96 which rotates upward to simultaneously unclamp hooks 40 and retract pegs 102. Then a lift 175 may engage the lifting plates 37 for separation upwards of the lids 30 from the base 20. The lids 30 are elevated to the roller-conveyor 138 where they are free to return by gravity to the clamping station 160. The bumpers 38, at the front and back of each lid 30 serve as cushioning between the lids and prevent damage thereto.

Meanwhile, the base 20 and finished product therein continue downward by gravity to the unloading station 180. There the product is separated from the base 20. The base is then lowered on lift 185 to the roller-conveyor 139 for gravity return to the assembly station 140. Thus in this manner an automatic machine process laminated product is provided.

I claim:

1. A fixture for the automatic processing of a laminated product by travel in a machine therefor, comprising in combination: a base; a lid; clamping means for automatically fastening said lid on said base while said product is held therebetween; pneumatic means between said lid and base for applying pressure upon said product; release means for said pneumatic means for activation at a limit of said travel to open and relieve said pressure; and trip means for activation at a limit of said travel to disengage said clamping means, enabling a separation of said lid, base and product, said pneumatic means including an enclosed chamber and a movable pressure plate at the bottom side of said lid, said chamber being formed in said lid, said plate enclosing said chamber, said pneumatic means including a pneumatic insert receptacle, and a conduit leading from said receptacle to said chamber, flexible diaphragm strip means providing a flexible and air tight bridging connection between the periphery of said plate, and the lid, said diaphragm strip means being affixed along the peripheries of said lid and plate to enclose said chamber therebetween and provide a flexible support permitting relative movement between said plate and lid.

2. A fixture for the automatic processing of a laminated product by travel in a machine therefor, comprising in combination: a base; a lid; clamping means for automatically fastening said lid on said base while said product is held therebetween; pneumatic means between said lid and base for applying pressure upon said product; release means for said pneumatic means for activation at a limit of said travel to open and relieve said pressure; and trip means for activation at a limit of said travel to disengage said clamping means, enabling a separation of said lid, base and product, said pneumatic means including an enclosed chamber and a movable pressure plate at the bottom side of said lid, said chamber being formed in said lid, said plate enclosing said chamber, said pneumatic means including a pneumatic insert receptacle, and a conduit leading from said receptacle to said chamber, a flexible diaphragm between said lid and plate, said diaphragm affixed along the peripheries of said lid and plate to enclose said chamber therebetween, said receptacle having a one-way insert valve, and said release means including a release valve and conduit leading from said chamber.

3. A fixture in accordance with claim 2, wherein said release valve has an inclined release lever which is depressed to open by engagement with a limit stop riding thereby.

4. A fixture in accordance with claim 3, wherein said clamping means include hook members pending downward from said lid and detent blocks carried on said base for engagement therewith.

5. A fixture in accordance with claim 4, wherein said hooks are journaled on pins paralleling the periphery of said lid and including springs to bias said hooks inwardly.

6. A fixture in accordance with claim 5, wherein said detent blocks are journaled on rods paralleling the periphery of said base at corresponding positions for engagement with said hooks.

7. A fixture in accordance with claim 6, wherein said detent blocks have chamfers, said trip means linked to said rods to turn said detent blocks upon said activation and position said chamfers opposite said hooks for disengagement therefrom.

8. A fixture in accordance with claim 7, wherein said trip means is a projecting lever linked to said rods.

9. A fixture in accordance with 8, including position members spaced along the periphery of said base for alignment of said product therein, said rods journaled in said members.

10. A fixture in accordance with claim 9, wherein said members have bores perpendicular to said rods and including position pegs received in said bores, said pegs contacting the peripheral edges of said product for proper alignment thereof.

11. A fixture in accordance with claim 10, wherein said rods engage said pins and have flats opposite thereto, allowing said pins to retract into said members.

12. A fixture in accordance with claim 11, including coil springs mounted in said bores to bias said pins toward said rods, said flats and chamfers at an angular spacing on said rods to provide simultaneous disengagement and retraction of said hooks and pins respectively upon rotation of said rods by activation of said projecting lever at said limit of said travel.

13. A fixture in accordance with claim 12, including various dimensioned inserts for interchange between various product sizes by placement on said base, said inserts having retractable extension pegs contacting said position pegs.

References Cited

UNITED STATES PATENTS

| 2,363,933 | 11/1944 | Bendix | 144—281 |
| 3,133,850 | 5/1964 | Alenivs | 156—580 X |
| 3,376,184 | 4/1968 | Ritchey et al. | 156—580 |

BENJAMIN A. BORCHELT, Primary Examiner

S. C. BENTLEY, Assistant Examiner

U.S. Cl. X.R.

100—269